United States Patent Office 3,494,670
Patented Feb. 10, 1970

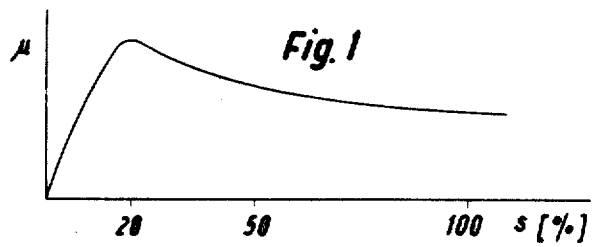
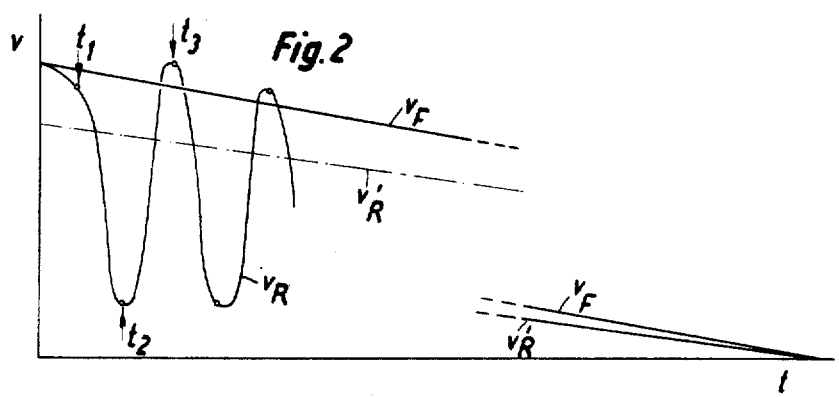
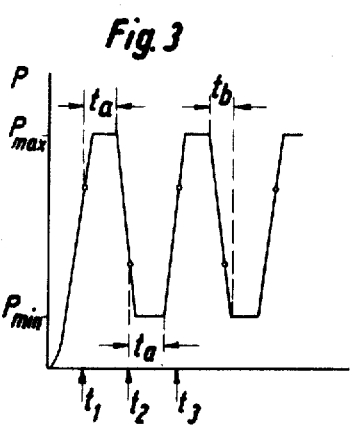
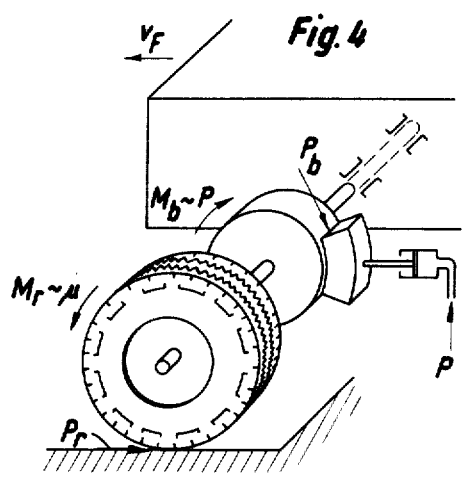

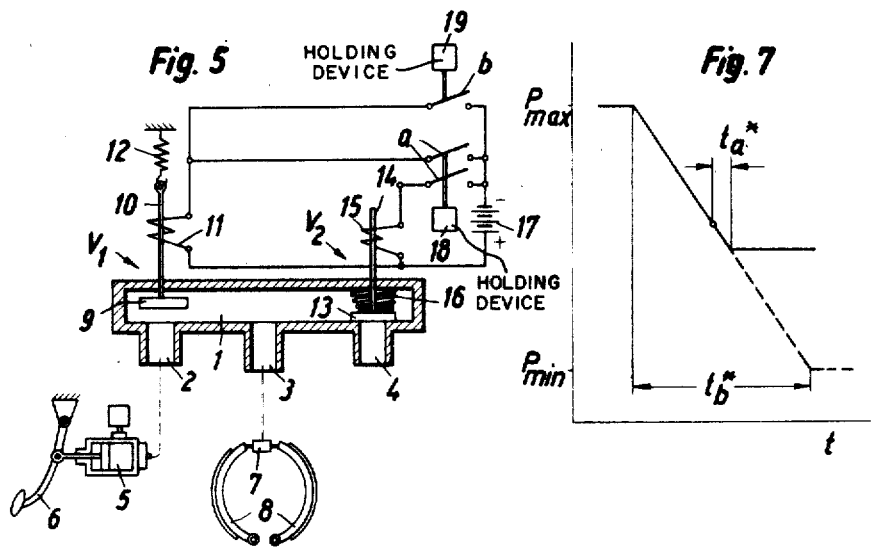
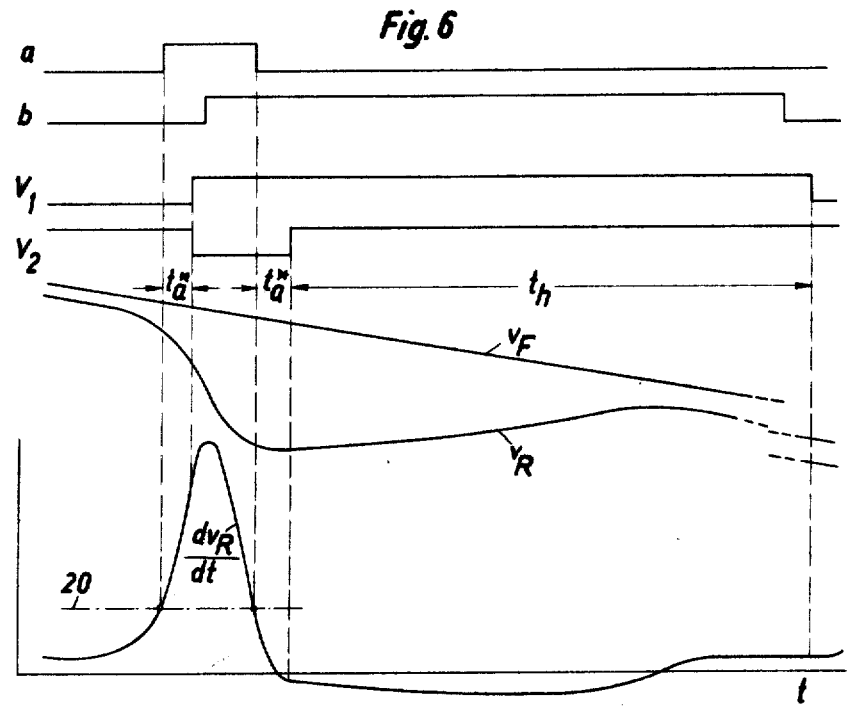

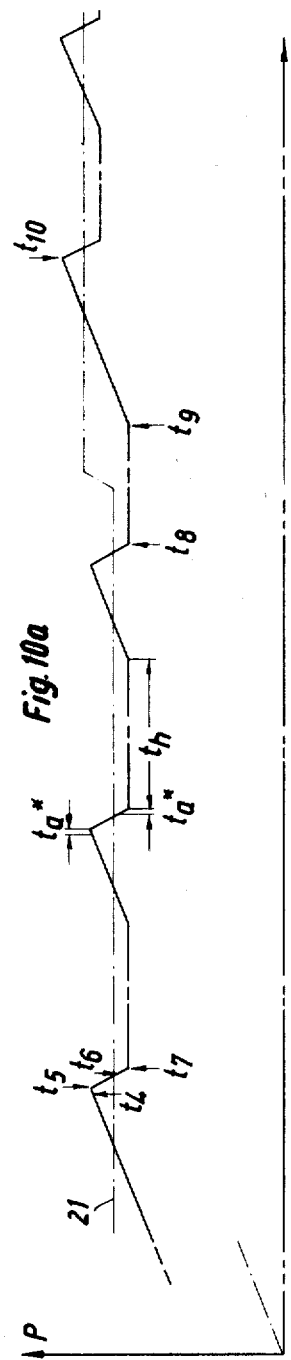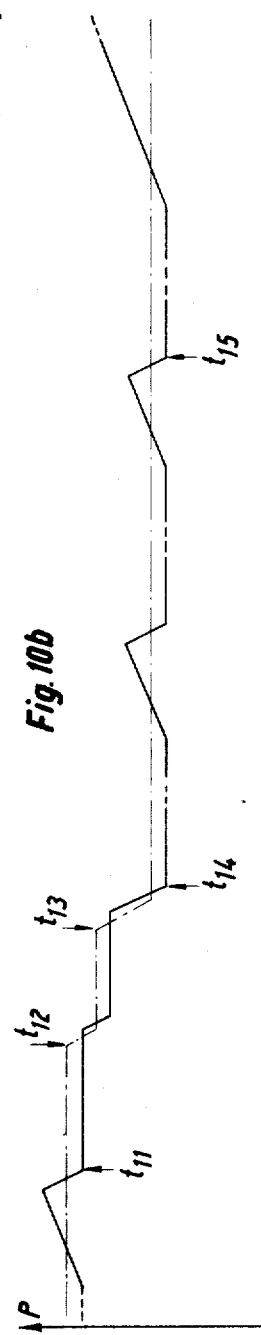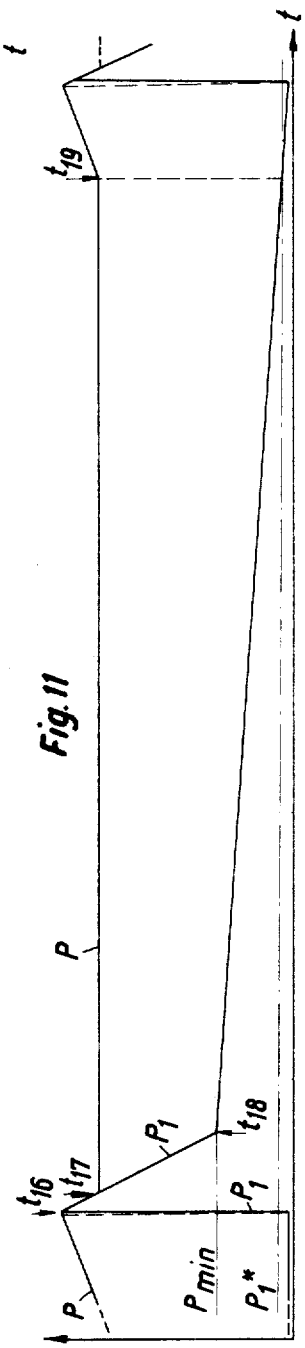

3,494,670
APPARATUS FOR THE REGULATION OF THE BRAKING PRESSURE TO OBTAIN A NON-SKID EFFECT IN AUTOMOTIVE VEHICLES
Heinz Leiber, Leimen, Germany, assignor to Graubremse G.m.b.H., and Teldix Luftfahrt-Ausrunstungs-G.m.b.H., Heidelberg, Germany, both corporations of Germany
Filed May 10, 1967, Ser. No. 637,526
Claims priority, application Germany, May 12, 1966, G 46,880
Int. Cl. B60t 8/02
U.S. Cl. 303—21                           13 Claims

ABSTRACT OF THE DISCLOSURE

An apparatus for adjustment of the brake pressure for obtaining a non-skidding effect on vehicles, wherein the brake pressure moves independently from the force performing the brake operation in dependency upon the occurring rotary retardations of the wheels of the vehicle between a maximum and a minimum value. The apparatus includes means for retaining constant temporarily, at least approximately, the brake pressure, and the brake pressure retaining means have a response time which amounts to a portion of the pressure dropping time required for the dropping of the brake pressure from its maximum value to its minimum value.

---

The present invention relates to an apparatus for adjustment of the brake pressure for obtaining a non-skidding effect on vehicles.

Arrangements are known for the prevention of blocking a vehicle. The pressure in the operating cylinder of the wheel brakes, called below simply brake pressure, is thereby lowered upon action of a retarding device such, that the pressure medium is taken from the conduit disposed in front of the operating cylinders and fed to a receiving container having nearly no pressure.

If such arrangement is used in fluid brakes having a main brake cylinder or also with braking force amplifiers and also an additional secondary cylinder as a pressure source, the danger exists that the volume reserve beyond a predetermined number of working cycles does not suffice any more. It is to be understood that the working cycles include below also the time period from the acting of the retarding device in case of increasing rotary retardation of the wheel up to the following equal action. A cycle thus comprises also the lowering and re-rising of the brake pressure. In the worst case, the piston forming the brake pressure source arrives at the end of its moving stroke in the cylinder before the vehicle is sufficiently braked. The driver would be required in this case to release the brake pedal, so that the cylinder or the cylinders can be filled again, in order to brake further the vehicle.

If one wishes to avoid this drawback and to provide a sufficiently large volume reserve for safety, in accordance with the status of the prior art, an enlargement of the conventional main or secondary-brake cylinders in non-skidding brakes cannot be avoided. Yet, even if this arrangement is used in connection with air pressure brakes, or, as known, in pump brakes, it is required, based on known experiences, to work with higher pressures, and to dimension at a larger scale the present pressure equalization containers, respectively, in order to provide a greater reserve on the pressure medium.

The improvement concerning the volume reserve is brought about, in accordance with the proposals by lowering the pressure to an increased minimum pressure and by bleeding of a constant volume in each working cycle, respectively.

It is one object of the present invention to provide an apparatus for adjustment of the brake pressure for obtaining a non-skidding effect on vehicles, wherein a control system is provided, according to which lesser pressure medium is released for each working cycle than before. This means, that the number of the possible working cycles is to be generally increased.

All previously proposed or known non-skidding brake systems operate in such manner, that the brake pressure varies between a maximum and a minimum value, as long as the brake is operated briskly and the state of the road surface is such, that the system does not respond to all. The maximum value is determined by the force, with which the brake pedal is pushed down. The minimum value, which is reached by the brake pressure practically during each pressure drop, is rigidly set for the prevailing control system or is in a fixed relation to the maximum value. The manner, how the minimum value is set in the different systems individually, is of no consequence for this observation. It is important, however, that the brake pressure varies continuously between two pressures which are far apart from each other and, thereby, always increases much higher and drops much more, as it would be desirable for an "optimum braking."

It is another object of the present invention to provide an apparatus for adjustment of the brake pressure for obtaining a non-skidding effect on vehicle, wherein the brake process is made to a stronger extent "continuously," that means the brake pressure process is better adjusted to that performance which brings about an optimum braking effect independently from the condition of the road surface. It is, thus, also desired, to retain the slip of the wheels as long as possible and as close as possible and as close as possible at the value and to maintain the same variation about the value, respectively, which corresponds with the friction coefficient maximum.

It is still another object of the present invention to provide an apparatus for adjustment of the brake pressure for obtaining a non-skidding effect on vehicles, which includes a control system, in accordance with which an apparatus is provided for a timely, at least approximately constant retaining of the brake pressure and wherein the response time period of this device amounts to only a small portion of the time, which is at least required for the brake pressure for dropping from its maximum value to its minimum value.

The basic concept resides thus in the fact not to permit a drop of the brake pressure to a previously predetermined pressure, and in the normal case, to a minimum limit which is much too low, rather to influence the brake pressure during the time of its dropping and in particular in accordance with the prevailing friction conduct of the wheel, which, as is known, is measured by the rotation retardation. This requires extremely fast operating valves or other control devices and, under certain circumstances, an influencing of the time function of the original pressure drop unhindered by these control devices. This time function is flattened, if necessary, by throttle elements in the pressure lowering conduit.

Starting with the previously proposed system, which comprises an inlet valve in the main pressure conduit leading to at least one wheel brake cylinder and an outlet valve in the corresponding pressure lowering conduit, whereby the inlet valve closes upon rising of the wheel retardation closes in response to a predetermined retardation limit value and the outlet valve opens, so that the brake pressure and the wheel retardation are lowered, then the present invention can be characterized such, that as soon as the wheel retardation reaches again the retardation limit value, the outlet valve closes within the previously stated responding time, while the inlet valve remains at first in its closed position and opens again at the most upon passing of a predetermined holding time starting upon each closing of the outlet valve. Means to bring about such holding time automatically are available in large numbers. In the front are for this purpose transistor circuits or hydraulic auxiliary means, which will be further discussed, can be used for this purpose.

A further development of the present invention resides in the fact, that, as has been mentioned above, a throttle is disposed in the pressure reducing conduit, thus in the conduit leading from the brake operating cylinder into the atmosphere or to a nearly pressure-free receiving container. The throttle effect can also be obtained by corresponding design of the outlet valve or by a structural combination of the outlet valve and of the throttle.

It can be of advantage, if the pressure drop characteristic line has a buckling shape, the pressure diagram thus at first is very steep and then drops more flatly. This is brought about such, that the throttle follows the outlet valve in the direction of flow and between both is arranged dropping valve in a parallel conduit for each and a further throttle is provided with a smaller flow cross-section. As a pressure dropping valve is characterized a valve, which is operated only by the pressure on the feeding side and is opened, as long as this pressure is above the friction pressure. The pressure fluid will then flow off at first through the pressure dropping valve and the throttle of larger cross-section. As soon as, however, the pressure dropping valve, which is correspondingly set, closes, the pressure fluid has as its only path through the additional parallel disposed throttle, so that from here on, the pressure will drop at a slower path. The throttles can be temperature-compensated, so that the time function, after to which the brake pressure drops, is independent as much as possible from the temperature. Practically, this can be brought about such, that the throttle is formed as an annular split between the wall of a passing opening and a closing body disposed in front of the passing opening or partly projecting therein. The closing body can be produced of working material having a large heat extending coefficient. Depending upon the choice of the length of the closing body and, under certain circumstances, the degree of its tapering, different functions result for the narrowing of the flow cross-section at rising temperature. By this arrangement, the temperature dependency of the pressure fluid viscosity can be compensated at will.

In a further development of the concept of the buckled pressure drop characteristic, it is proposed to displace the buckling point in dependency upon the retardation. This can be realized such, that in a second parallel pressure drop conduit, a second throttle and a second outlet valve are provided, which second outlet valve is controlled in accordance with a second higher retardation limit value. Thus, a second retardation device or a second contact with a different setting provided. This measure would be required, however, only under particularly extreme conditions, if, for instance, a vehicle, during full braking, happens to move from a dry road to a very smooth road. In this case, an extremely high wheel retardation occurs, which causes response also of the second device. This device will shift at first again in the opposite direction, whereby it locks the second pressure reducing channel.

Another further development of the present invention resides in the fact that only the time function of the pressure drop, but also the time function of the pressure increase is to be flattened, that means, that also into the main pressure conduit and in at least one of its branches, under certain circumstances, a temperature compensating throttle is inserted.

In order not to required that total presure fluid volume, which is necessary, in order to bring the brake shoes into engagement, is pushed through the throttle and the inlet valve, wherefore an appreciable time would be required, it is proposed to bridge over the throttle and under circumstances, the inlet valve by means of a pressure limiting valve with greater flow cross-section than the throttle. A pressure limiting valve is to be understood a valve, which is operated and opened only in dependency upon the pressure on the outlet side, as long as the latter is below the shifting pressure. Such valve can be realized such, that the valve body is influenced in the closing direction by a weak spring, and in opening direction by a resilient membrane exposed to the pressure behind the throttle and the brake pressure, respectively.

It has been set forth above, that the brake pressure is "approximately" constant during the holding time. This should also include the possibility that it grows very slowly, namely so slowly, that the retardation device does not respond again prior to the termination of the holding time. By this arrangement, the friction coefficient which sets itself stabile during the holding time, is brought still somewhat closer to the maximum. Thus, within the framework of the basic concept of the present invention, a further improvement is brought about. Practically, such slow increase of the brake pressure is obtained by a vacuum leak in the inlet valve or by a particular leak throttle bridging over the valve and, under circumstances, the corresponding throttle.

It is now still further to be disclosed, how the holding device is constructed, which hinders at first the effect of the shifting movement of the retarding device upon the inlet valve, if the retardation drops to or below the limit value. With a transistor circuit, this problem can be solved such, that one or a plurality of transistors are connected through by means of RC-members.

Within the framework of a transistor circuit, it is also possible to live up to the requirement with temperature dependent switching elements, to extend the holding times at low temperatures in comparison with higher temperatures. This measure is based on the fact, that during winter time at low ambient temperatures, the road is often particularly slippery, according to experience. In case of a slippery road, however, particularly many working cycles are required. By extending of the holding time, the individual working cycle is extended and thereby within a predetermined time unit less pressure fluid is released than in case of a more frequent succession. One takes only in stride thereby, that, upon occurring of more non-skidding road portions the chance, to increase again the brake pressure, is exploited to a somewhat lower measure.

A similar proposal moves in the same direction. It resides in the fact, to extend the holding time in dependency upon the number of working cycles. This can also easily be realized by electrical means, under certain circumstances, in a somewhat complicated manner. One starts thus to brake at first with relatively short holding times; then the holding times become continuously longer, so that it is necessary to partly disregard extremely short brake paths only then, if the road is anyway slippery and the brake path is long.

The same influencing possibilities for the holding time result in connection with a hydraulic solution of a holding device, proposed below, which should preferably be used as follows: Accordingly the arrangement receives a holding contact controlled in pressure-dependency and which operates the inlet valve. The holding contact is made dependent upon the starting pressure of the outlet valve, as long as a parallel circuit of a pressure-retarding valve and a throttle of smaller cross-section and then a further throttle of larger cross-section follows, as mentioned above. The starting pressure increases at first to an opening of the outlet valve very strongly, in order to drop relatively fast over the throttle of larger cross-section, until the pressure drop valve closes. Accordingly, the setting of the smaller throttle determines the pressure drop. The time required therefor is the holding time. An extension of the holding time in cold weather results by itself, as long as the pressure fluid becomes more viscous, which is mostly the case. In addition, the desired temperature run can be obtained also with the already mentioned means for temperature compensation.

In order to bring about an extension of the holding time with increasing number of working cycles, use is made of an accumulator chamber, in accordance with the previous proposals. There, however, the accumulator chamber was provided only for the purpose, not to require that the pressure dropping conduits are fed to the collecting vessel. The chamber has a movable wall and stands under a small spring pressure. Accordingly, it can discharge also by means of a back-pressure valve into the main pressure conduit, as soon as its pressure has dropped after the braking process. In accordance with the present invention, the flow cross-section of the small throttle is brought into controlled connection with the movable wall such, that upon increasing filling of the accumulator chamber, the flow cross-section of the small throttle is reduced.

With these and other objects in view, which will become apparent in the following detailed description, which discloses the present invention by example only, the present invention will be clearly understood in connection with the accompanying drawings, in which:

FIGURE 1 is a diagram depicting the known dependency of the friction coefficient between the road surface and the wheel from a slip;

FIG. 2 is a diagram depicting the speed of the vehicle in relation to time;

FIG. 3 is a diagram depicting the brake pressure condition during the time period for a few working cycles of the previously proposed nonskidding brake system, shown schematically;

FIG. 4 is a schematic perspective view of a vehicle wheel with a pressure fluid operated drum brake, as an example for the effect directions of the working forces, moments and speeds;

FIG. 5 is a simple embodiment of the apparatus designed in accordance with the present invention, without individually formed throttles;

FIG. 6 is a time-diagram for clarification of the operation of the arrangement disclosed in FIG. 5;

FIG. 7 is a pressure-time diagram;

FIGS. 10a and 10b are diagrams depicting the desired brake pressure performance over a longer time period;

FIG. 11 is a pressure-time diagram of the hydraulic holding device disclosed in FIG. 8;

Figure 8:
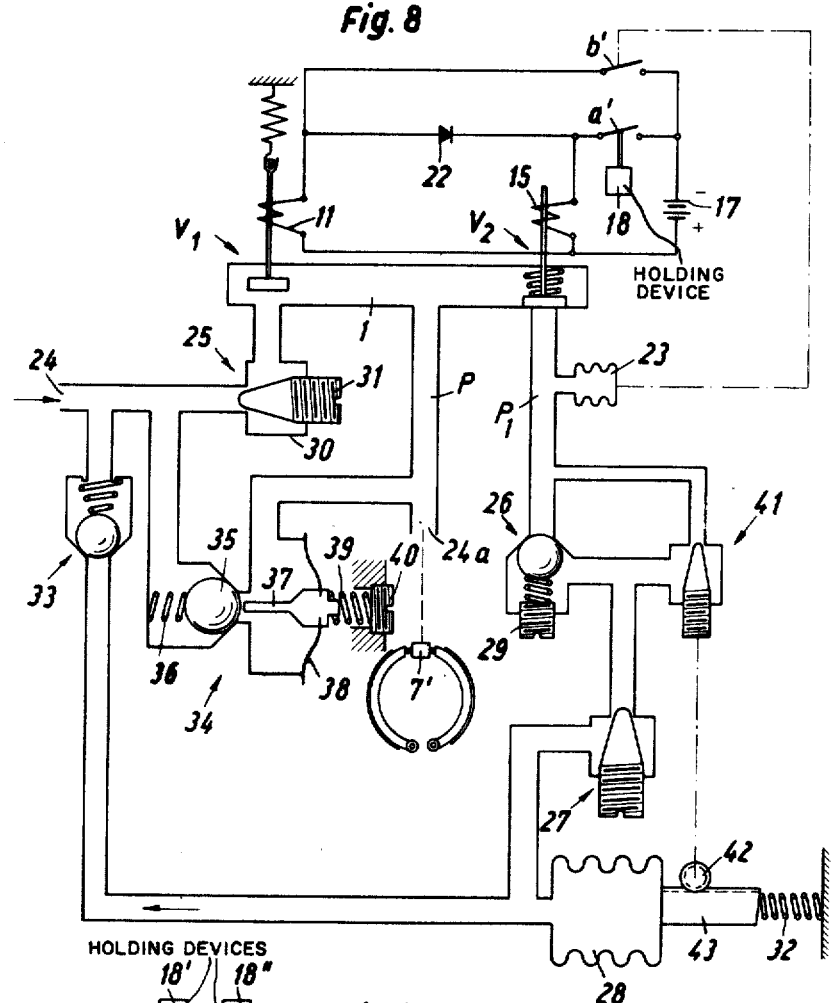
FIG. 8 is a schematic showing of another embodiment of an appreciable expanded arrangement in accordance with the present invention.

Referring now to the drawings, and in particular to FIG. 1, the friction coefficient is indicated as $\mu$ and the slip with $s$. Slip means the ratio of the difference between the vehicle speed $v_F$ and the rotary speed $v_R$ of the wheel to the vehicle speed, thus:

$$S = \frac{v_F - v_R}{v_F}$$

The maximum of the friction coefficient (for a dry road) lies at about 20% slip and sinks then, for instance, to the half value. In case of a wet road, the maximum is moved somewhat towards the left, aside from the fact, that it is lower. The basic curve appearance is, however, independent from the road surface.

If it would thus be possible, to maintain during a complete braking the friction coefficient at its maximum, then the "optimum braking" would be realized.

Referring again to the drawings, and in particular to FIG. 2, the assumption is made therein that the road remains equal along the brake path and the slip lies at about 20%. The vehicle speed $v_F$ and the optimum wheel rotary speed $v_R{}^1$ show a constant time reduction, whereby both lines run together at the moment of a stop.

The conditions obtained so far should be described below by means of the mentioned figures. The brake pressure could increase at the start of a full braking to the value $P_{max}$. Already at the time point $t_1$, the increasing wheel retardation reaches the retardation limit value, in which the retardation device starts the pressure drop. Starting with $t_1$ still the response time $t_a$ of the pressure control device passes, until the brake pressure actually drops again. In this time interval, the wheel is retarded always stronger, in spite of the fact that the brake pressure P and thereby, at least for the present consideration, the braking force $P_b$ and the brake moment $M_b$ effective on the wheel remain constant. This is brought about by the fact, that the friction coefficient is in the meantime already in the state of lowering beyond the maximum, so that the friction force $P_r$ effective from the road on the wheel and the friction moment $M_r$, respectively, drops relative to the constant brake moment $M_b$. Since, now, however, with the run of the acting time period $t_a$, the brake pressure drops, $M_b$ drops within a short time below $M_r$, the wheel is more slowly retarded and eventually accelerated, whereby its rotary speed $v_R$ increases, if possible, beyond $v_F$. At the time point $t_2$ at which the retarding limit value has been reached again, the device starts again the pressure increase. Prior thereto, however, here also a responding time $t_a'$ passes. As long as $P = P_{min}$ and thereby also $M_b$ remains constant, the acceleration follows the friction moment $M_r$, that means in accordance with the friction coefficient $\mu$ depending upon the slip. The friction coefficient $\mu$ runs now through its maximum in opposite direction and falls then to a low value with very small slip. Since now, however, the brake pressure increases again after the run of $t_a'$, the wheel is again stronger retarded until, at the point $t_3$, the next working cycle starts.

The drawback of the variations of the brake pressure between two values, taken in stride until now, resides not only in the fact, that the braking process is not at its optimum and thus the brake path is longer than it could possibly be. It has also been shown that, from the wheels, which due to the brake pressure control art continuously strongly retarded and again strongly accelerated, start jolts and extremely high mechanical swinging wear upon the wheel suspensions and upon the differential drive, respectively, and also upon the further driving elements. Particularly dangerous are tread oscillations observed on the front wheels (wheel planes alternately converging and diverging). Surprising torsion angles occur on the Cardan shaft.

Referring now again to the drawings, and in particular to FIG. 5, the apparatus comprises a longitudinal connecting chamber 1, which has three branches 2, 3 and 4. The branch 2 is in communication with a main pressure cylinder 5, by means of a conduit shown by dotted lines which is operated by a brake pedal 6. From the branch 3, a conduit leads to a wheel brake cylinder 7, which operates two brake shots 8 of a drum brake. Likewise, several wheel brakes can be connected. The third branch 4 leads to a practically pressure-free chamber (not shown), such for instance to the pressure fluid collecting vessel, which a valve body 9, an anchor 10 rigidly connected with the main brake cylinder, to the collecting container of a pump brake, to an accumulator chamber or, in case of air pressure brakes, into the atmosphere.

Two magnet controlled valves $V_1$ and $V_2$ open or close the collecting branches 2 and 4. The valve $V_1$ comprises a valve body 9, an anchor 10 rigidly connected with the latter, and a magnet winding 11. The valve $V_1$ is maintained normally in open position by means of a pulling spring 12 and closes, when the winding 11 is excited. The other valve $V_2$ comprises correspondingly a valve body 13, an anchor 14 and a magnet winding 15. It is, however, normally held in closed position by a spring 16 and opens only, when the magnet winding 15 is excited. The windings 11 and 15 are connected each over a contact $a$ to a current source 17. The contacts are jointly operated by means of a retarding device 18. Parallel to the contact $a$, which is in series with the magnet winding 11, an additional contact $b$ is provided, which is controlled by a holding device 19. As a matter of course, instead of the mechanical contacts, also semi-conductors or other switching elements, can be used.

It is to be stated that the flow resistance of the valves is arranged exactly and most possibly settable in view of the required throttle effect. The measuring is further developed below. Likewise, also particular throttles can be arranged in front of or behind the valves. The operation of the arrangement is explained in connection with FIG. 6 of the drawings. In the upper part of this figure the movement of the contacts and of the valves are indicated. In the lower part of the figure, the vehicle speed $v_F$, the wheel rotary speed $v_R$ and the wheel retardation $dv_R/dt$ are depicted in relation to the time. The three last mentioned curves should relate to the joint base line.

At first it should be assumed, that the brake pedal is operated mildly only. Over the opened valve $V_1$, the brake pressure increases then and the wheel considered here is retarded relative to the vehicle. In accordance with FIG. 1, the friction coefficient thus increases with increasing slip. Accordingly, also the friction moment $M_r$ increases relative to the brake moment $M_b$, until an equilibrium is obtained, in which the wheel retardation corresponds approximately with the vehicle retardation and the slip remains constant. This is shown in FIG. 6 at the start of the considered time section. If now the brake is operated more strongly and the wheel is thus more strongly retarded, then the wheel retardation reaches the limit value 20. The retarding device 18 causes this condition, that means, the contacts $a$ close. Upon passing of the responding time $t_a^*$, both valves change their positions. Since the main pressure conduit is now closed, the brake pressure cannot increase further. It drops rather after the time function determined by the flow resistances, since the pressure fluid can now flow off through the valve $V_2$ and, under certain circumstances, by means of an additional throttle from the wheel brake cylinder.

The brake moment does not follow, however, exactly synchronously the brake pressure. It runs rather slightly behind and particularly clearly during braking with a salf-increase, the so-called Servo brakes. With the drop of the brake pressure thus the brake retardation rises still slightly, surpasses a maximum and drops thereafter likewise again. During the run through the limit valve 20, the retarding device 18 opens again its two contacts $a$. This affects, however, only $V_2$, since, in the meantime, the holding device 19, which is to be covered below, has closed the contact $b$. The winding 11 remains thereby excited, and $V_1$ is closed. Upon run of the responding time $t_a^*$, $V_2$ closes also and from here on, the brake pressure remains nearly constant. The brake moment has become in the meantime smaller already than the friction moment, so that the wheel accelerates again. When $V_2$ closes, the slip is, however, larger than 20%. The working point is thus to the right of the friction coefficient maximum in the $\mu$–$s$ curve. With the reducing slip, the friction moment moves from here beyond the maximum, reaches then during the zero-passage of the retarding curve the same value as the brake moment and drops thereafter still further, until the original equilibrium between brake moment and friction moment is restored with a constant slip value. Only now, the contact $b$ opens and thereafter the valve $V_1$ again. Up to this point, the holding time $t_h$ sufficies. The brake pressure starts to build up anew, until during renewed response of the retarding device, the next working cycle starts. It has been found by experience that, with each following working cycle, the previously mentioned constant slip value comes closer to the slip value bringing about the friction coefficient maximum. The friction coefficient plays itself to the maximum.

If now the course of the wheel peripheral speed is compared with the course shown in FIG. 2, it will be apparent that the rotary speed does not drop as strongly and after the relatively steep drop rises again appreciably slower. The wheel remains thus totally much longer in the slip range, which brings about a high friction force at the wheel periphery and, thereby, a strong vehicle retardation. This is, however, not recognizable from the chosen showing, since as the vehicle speed $v_F$ only a medium value has been assumed, which does not depend directly from the brake process on the observed wheel.

This favorable effect assumes, that the brake pressure on the one hand drops very fast; on the other hand, however, during the drop can be caught. Thus, the responding time $t_a^*$ must be clearly smaller than the pressure drop time $t_b^*$, as is shown in FIG. 7. During a responding time of, for instance, 3 milliseconds, it is intended, by setting of the throttle to equalize the pressure dropping time to about 30 milliseconds, related to about $P_{max.}=100$ atmospheres above atomspheric pressure and $P_{min.}=20$ atmospheres above atmospheric pressure. The holding time $t_h$ should amount, however to 200 or 300 milliseconds. Beyond that it is of advantage, also to throttle the pressure rise so much that, by means of the timing point of the device signal, the height of the pressure top can be influenced. Of particular importance is the flattening of the pressure rise again in connection with Servo brakes in view of the already mentioned time-lag of the brake moment.

The course of a plurality of working cycles within the total brake process can be explained at best in connection with the timely brake pressure course, as is shown in FIGS. 10a and 10b. Here, as well as in FIG. 7, the pressure variations are shown time-proportional for the sake of simplicity. In reality, they follow more or less exactly to an exponential function. This has only the advantageous consequence, that the exactness of the influence on the varying pressure depends upon the pressure level. In case of a smooth or slippery road, that means at low brake pressure, the setting of the correct pressure value becomes more exact, which is particularly desirable.

In FIG. 10a, it is assumed that the valves are designed such as to the direction of the flow or jointly with their throttles operate as about the structure shown in FIG. 8 such, that the pressure drop is about five times as fast as the pressure rise. The pressure drop cannot be made selectively flat, since, otherwise, the brake moment $M_b$ does not catch up any more with the likewise fast dropping friction moment $M_r$. Furthermore, emphasis is put on the fact, that also during a relatively low vehicle speed, still a working cycle is performed. It is known that with speeds getting lower, the avoiding of blocks becomes more difficult, since the time between the occurrence of a measurable increased retardation and the wheel stand-still get shorter. According to experience, one can reach, for instance, within the already given pressure dropping time $t_b^*$ and with valves of a given response time $t_a^*$ from a speed of 10 km./hour, a timely response of the retarding device, that means that a blocking is avoided. This is to be considered as sufficient. During a pressure increase, this measuring limit is not given, so that it can be more flat. Under circumstances, the time up to the first effect of the brake can be too long due to the throttling. Here, if necessary, some measures of help are possible, which will be still covered below.

For saving of space, the FIGS. 10a and 10b are interrupted during the individual holding times and during the starting pressure increase, respectively. This time interruption is indicated by dotted lines at the interrupted points.

At the start of the braking process, the pressure rises from zero up to beyond the blocking limit 21 indicated by a point-dotted line. By the blocking limit 21, the brake pressure level is to be understood, with which or above which the wheel comes sooner or later to a blocking position. In connection with a predetermined vehicle is thus a blocking limit an image of the surface condition of the road. At $t_4$ the retardation has assumed such proportion, that the retardation device gives contact. Upon passing of the response time at $t_5$, both valves switch over and the pressure drops again below the blocking limit. At $t_6$, the retarding device opens again its contact $a'$, at $t_7V_2$ closes and from here on the pressure remains constant during the holding time. The response times and the holding time are given already by example in the following equal working cycle.

During the holding time starting at $t_8$, the road may have improved. The blocking limit has, thus, moved upwardly. From here on, the constant retained brake pressure is lower than it could be, without causing a blocking. This state changes, however, immediately, if the pressure starts to increase again starting from $t_9$. It increases now namely higher than before, since the wheel retardation reaches the limit value later than in the previously mentioned situations. After the renewed dropping of pressure, starting at $t_{10}$, the pressure lies again for the same low amount below the new blocking limit, as before. Also, in the two following working cycles, this pressure will be newly set.

The opposite case takes place at $t_{12}$ (FIG. 10b). Here, the road becomes more slippery and the blocking limit sinks suddenly. At this point, the holding time starting at $t_{11}$ has not run out. Nevertheless, the retarding device takes it up immediately and the pressure drops to a corresponding lower level. The same is repeated at $t_{13}$, where the jump is still greater. Starting from $t_{14}$, a new non-interrupted holding time runs, which as followed still by two pressure increases. After $t_{15}$, the vehicle can finally come to a standstill. Upon run of the holding time, the pressure rises thus to its highest value, as long as the driver has not released the brake pedal already before. Thereafter, the pressure drops again to zero, which is not shown.

With the present invention, in this manner, a steady new adjustment of the brake pressure to the prevailing road conditions is obtained, even if they change during the brake process. The pressure increases, which are released with the run of the individual holding times, constitute to a certain extent "periodic road tests." They have the aim to determine whether the road has not become in the meantime more non-skidding and permits an increase of the brake pressure. On the other hand, the control system is continuously in the position to determine that the road has become more slippery. In this connection, a "permanent road test" takes place. The brake pressure remains thus aside from the relatively short time, test performances closely below the blocking limit. If it drops, it is immediately adjusted and if it rises, at the latest upon running of the holding time of a duration of about 300 milliseconds. Thus, the present friction coefficient between road and wheel is nearly always exploited.

In the arrangement disclosed in FIG. 8, the apparatus comprises a collecting chamber 1 with the valves $V_1$ and $V_2$ and their windings 11 and 15. The electrical circuit differs relative to the showing in FIG. 5 by the fact, that the two contacts $a$ are replaced by a single contact $a'$ and that between the winding 11 and this contact, a rectifier 22 is inserted. By this arrangement, the cost is reduced and the operational safety is increased. The previous contact $b$ is replaced by a contact $b'$, which bridges over the valve and the contact $a'$. The contact $b'$ is operated by means of a mechanical connection from a bellows 23. The electrical operation of this circuit is the same as in FIG. 5. If $a'$ is closed, the current can flow from the plus terminal of the battery 17 over the winding 15 and in the same manner over the winding 11, and through the rectifier 22 conducting in this direction to the minus terminal of the battery 17. If the contact $a'$, however, is open, and $b'$ is closed, then the current can flow only through the winding 11, since the rectifier 22 locks the current in opposite direction.

The pressure fluid enters from the main pressure cylinder or another pressure source arriving at 24 into the hydraulic apparatus. It flows over a throttle 25 and the open inlet valve $V_1$, as well as over the exit 24a of the arrangement and builds up the pressure in the wheel brake cylinder 7'. The pressure drop takes place at opened outlet valve $V_2$ over a pressure reducing valve 26 and a like throttle 27. The pressure fluid collects then in a bellows 28 operating as an accumulation chamber. The pressure reducing valve 26 is set by means of a screw 29 to the so-called minimum pressure $P_{min.}$ of about 10 atmospheres. The throttle 25 is designed as the throttle 27 and comprises a housing 30 and a closing body 31 of synthetic material, which is screwed into a threaded bore of the housing. The closing body 31 is tapered down to a point disposed inside of the housing 30 and projects with the point into the mouth of the main pressure conduit. By this arrangement, an annular split is created between the cone and the wheel of the housing bore, which widens or narrows, down depending on the temperature-dependent expansion of the closing body. It has to be started, that the pressure fluid becomes more thin-liquid at higher temperature and that then a larger pressure fluid becomes more thin-liquid at higher temperature and that then a larger pressure fluid quantity flows through, so that the throttle effect is reduced. Due to the temperature dependent variation of the flow cross-section, it is brought about that the medium quantity of flow per time unit, and thereby, the time function of the prevailing pressure variation remains unchanged.

The storage or accumulator chamber is under the effect of a very weak pressure spring 32. The latter is arranged such, that it compresses the bellows and can discharge the fluid from the latter by means of a non-return valve 33 into the main pressure conduit, as long as no pressure is present there. The discharge thus takes place also upon termination of the braking process. For the understanding of the following statements, it is of importance that the pressure drop is not hindered and practically not influenced by the storage chamber and by the pressure reducing valve 26. Only the throttle 27 determines the speed of the pressure drop up to the minimum pressure limit.

Aside from the main purpose of the storage chamber, which is discussed below, it has jointly with the non-return valve 33 the advantage, this a particular return conduit to a remotely disposed pressure fluid collecting vessel is made superfluous. The total pressure control unit can rather be designed in a compact manner and be inserted with the branches 24 and 24a into the pressure fluid conduits, which lead to the wheel brake cylinders. This advantage is, first of all, of importance for the later equipment of existing vehicles with the apparatus of the present invention.

A further development over the structure disclosed in FIG. 5 is the pressure limiting valve 34 directly inserted between the main pressure conduit and the wheel brake cylinder. The valve ball 35 is pressed on its seat by means of a very weak spring 36. On the other side of the ball 35, a pin 37 is provided which is secured to a membrane 38 and is under the effect of a spring 39, which can be adjusted by means of a screw bolt 40. The return force of the membrane 38 jointly with the spring 39 is measured such, that the pin 37 lifts the ball 35 from its seat, as soon as the brake pressure drops below $P_{min}$. This valve has the purpose to reduce the time of application of the brake at the beginning of the brake process. The relatively large pressure fluid quantity which must flow into the brake system, until the brake shoes engage and the tubular conduits have expanded, can, at first, flow unhindered through the opened valve 34. Only starting with the already mentioned pressure of 10 atmospheres above atmospheric pressure, the valve closes, so that now the rising speed of the brake pressure depends solely upon the throttle 25.

Furthermore, in accordance with FIG. 8, measures are taken to determine and to influence the holding time, that means in this case the operation of the switch or contact $b'$. For this purpose, a small throttle 41 is provided which is disposed parallel to the pressure reducing valve 26 together with the bellows 23 operating as a pressure source. A pinion 42 is in meshing connection with the closing body of the throtle 41 and this pinion 42 connection engages a gear rack 43. The latter is secured to the cover of the bellows 28 and supports itself on the other side against a spring 32, so that it joins the filling movement of the bellows 28.

The operation of this hydraulic holding device is explained in connection with FIG. 11. The contact $b'$ closes, as soon as the pressure $P_1$ at the exit of the valve $V_2$ increases over a very deeply disposed limit value $B_1^*$ of about 0.5 atmosphere. At the start of the braking process $P_1$ is disposed below this limit value. The brake pressure P rises and $V_2$ is closed. At $t_{16}$, the valve $V_2$ opens. By this arrangement, the pressures equalize each other suddenly. In the meantime, the contact $b'$ has closed, as it is also shown in FIG. 6 for the corresponding contact $b$. Now, $P_1$ drops together with P. At $t_{17}$, the valve $V_2$ closes again. P remains constant, $P_1$ drops, however, by means of the valve 26 and the throttle 27 still further, until, at $t_{18}$, the valve 26 closes. From here on $t_1$ drops corresponding to the setting of the throttle 41 very slowly, until at $t_{19}$ finally, the limit pressure $P_1^*$ is reached, $b'$ opens and the brake pressure increases again. The setting of the throttle 41 determines thus the holding time lasting between $t_{17}$ to $t_{19}$. The holding time is also influenced on which height the brake pressure stands. This influence is, however, of minor importance, since the time interval between $t_{16}$ and $t_{18}$ amounts, at the most, to about 200 milliseconds, however, the holding time to at least about 10 times of this amount.

If now the storage chamber fills after several working cycles, the gear rack 43 moves towards the right and the closing body of the throttle 41 is further screwed in. By this arrangement, the holding times are extended during the run of the braking process.

Figure 9:
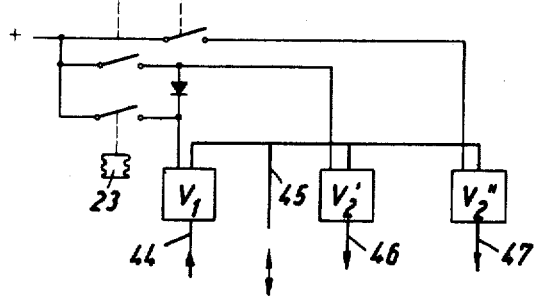
FIG. 9 is a schematic showing of an embodiment of the apparatus with two parallel pressure reducing conduits and two retarding devices in different positions.

The arrangement shown in FIG. 9 is shown still more schematically. The thick lines constitute pressure fluid conduits, and the thin lines constitute electrical conduits. Again, an inlet valve $V_1$ and an outlet valve $V_2'$ are arranged. The main pressure conduit 44 is connected to the valve $V_1$ and the wheel brake cylinder is connected at 45, while the conduit 46 leads to the collecting vessel. In a second pressure reducing conduit 47, which likewise leads to the collecting vessel, is arranged an additional outlet valve $V_2''$. $V_1$ and $V_2'$ are operated as shown in FIG. 8, and the contact operated by the pressure source 23 influences merely $V_1$. The contact operated by a first retarding device 18' operates with $V_1$ as well as $V_2'$. A third contact, which is operated by a second retarding device 18'', operates exclusively $V_2''$. The retarding limit value of the device 18'' is higher than that of the other device. If now, during a very strong braking action on a particularly slippery road, the pressure drop obtained by means of the valve $V_2'$ does not suffice, and the retardation still increases, then additionally $V_2'$ opens, so that the pressure from here on drops more steeply. The device 18'' switches then, however, also in the opposite direction, so that the device 18' alone determines the pressure which is then maintained constant.

Figure 12:
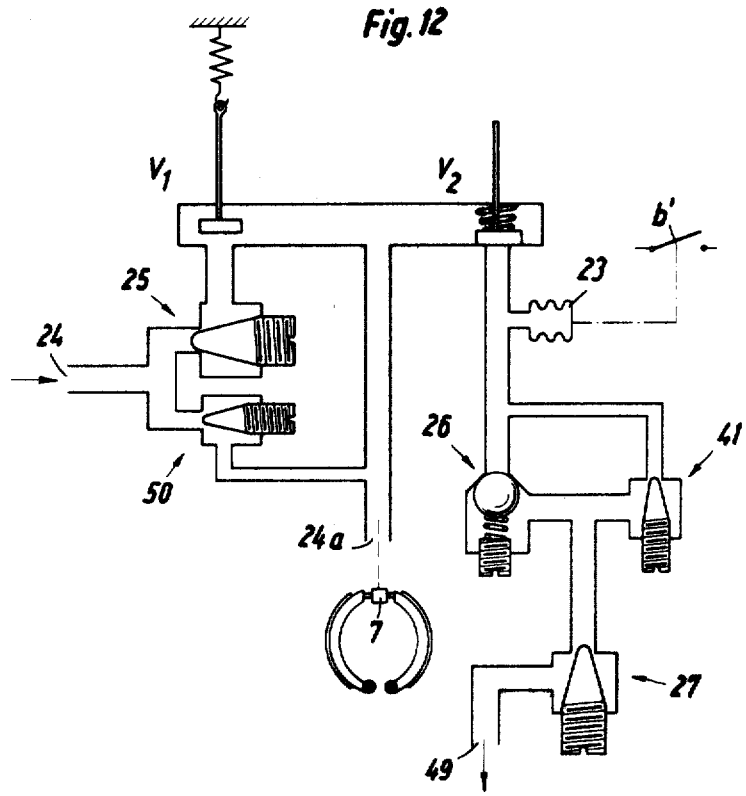
FIG. 12 is a schematic showing of a still further embodiment in connection with a leak throttle.

The embodiment disclosed in FIG. 12 leans to a great extent to the embodiment disclosed in FIG. 8. The storage chamber 28 with the corresponding non-return valve 33, as well as the apparatus for the adjustment of the throttle 41 are missing. Likewise, the pressure limiting valve 35 is omitted. The electric circuit (not shown in FIG. 12) can follow the circuit shown in FIG. 8. Contrary to the showing in FIG. 8, a leak throttle 50 is provided between the mouth 25 of the main pressure conduit and the exit 24a. This throttle 50 is designed in accordance with the throttle 41, thus, under circumstances, temperature-compensated. It bridges the inlet valve $V_1$, as well as the throttle 25, set in front thereof. The flowing cross-section is set extremely small.

Figure 13:
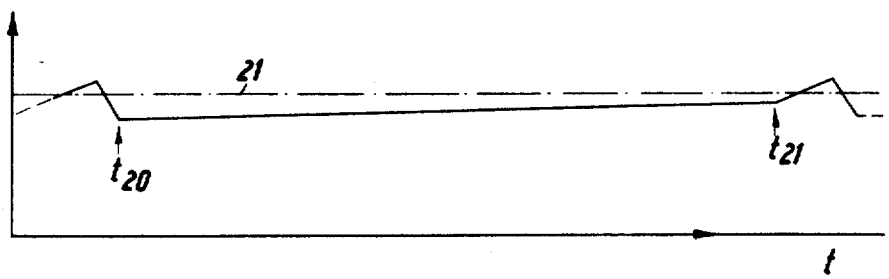
FIG. 13 is a pressure-time diagram complementary to the embodiment disclosed in FIG. 12.

Referring now again to the drawings, and in particular to FIG. 13, the operation will be apparent. With the start of the holding time, the brake pressure does not remain constant, rather increases very slowly, without, however, reaching the blocking limit 21 up to the run of the holding time at $t_{21}$. The increase of the pressure rise at opened inlet valve is thus set jointly by both throttles 25 and 50. It operates a multiple of the steepness during the holding time. Likewise, the rise of the pressure drop during the opening times of the outlet valve is, at the same time, determinable by the leak throttle 50. Also this influence can be compensated, however, by corresponding setting of the throttle 27 just once. A leak at the inlet valve or the special leak throttle 50 shown here, brings about that the friction coefficient moves still slower its maximum from the right towards the left (FIG. 1). If, the equilibrium between the braking moment and the friction moment has set itself again, the corresponding constant friction coefficient is closer to the maximum. As a plurality of other of the mentioned individual measures, it is also advisable to use the leak throttle particularly in connection with Servo brakes, since the latter require for releasing a comparatively large pressure drop below the blocking limit.

The present invention can also be used jointly for both wheels of a drive axle. It is desirable to equip the wheels, operatively connected by means of a differential drive, with a retarding device. The parallel arranged contacts of these two devices, step then into the place of the contact $a'$ in FIG. 8. The two devices are, however, contrary to the arrangement of FIG. 9 set to the same retarding limit value. As long as devices with double contacts disclosed in FIG. 5 are used, the corresponding contacts of both devices must be switched parallel.

In the response times $t_a$ and $t_a^*$, respectively, no difference was made until now, whether the corresponding valve opens or closes. In reality, attention must be paid, however, that never both valves are simultaneously open, since the pressure fluid could then flow off directly from the main pressure conduit through $V_2$. This contradicts, however, the aim of the present invention, which is set just for economic arrangement with the pressure fluid. Care must be taken, therefore, that $V_1$ closes faster than $V_2$ opens. Fortunately, this condition is complied with as a rule by itself, that the opening valve must overcome at first the force of the pressure fluid effecting the valve body. The valve body of the closing valve is, however, accelerated without this retardation. By this arrangement, a valve closing time which is shorter for 30% to 50% results. In a strong sense, the responding time on the rising branch of the pressure curve is to be understood also as the opening time of the valve $V_2$. The responding time on the descending branch of the characteristic line is, however, taken at exactly the closing time of the valve.

In the structure disclosed in FIG. 5, it has been assumed that the flow characteristics of the valves themselves contain the throttle effect. Beyond that, it is, however, also possible to neglect a parallel path over a pressure limiting valve 34 in accordance with FIG. 8, if in the construction of the inlet valve $V_1$, attention is paid that during application of the brake, at the start of the brake process, the flow occurring remains laminar, however, hard on the limit of the turbulence.

During the control process a very high pressure exists in front of the inlet valve. The latter causes then in the following opening performances of $V_1$ a turbulent stream and, thereby, a higher throttling effect. By advantageous arrangement, it can be achieved that during the control, nearly the same pressure rising speed occurs as during the first application of the brake, where the pressure has to be built up in the main pressure conduit by the effect of the muscle force of the driver and a brake amplifier or a pump, respectively. Also, a special temperature compensation of the pressure variation speed can be omitted under these conditions, since, as can be shown, a throttle effect produced by turbulence, varies only slightly with the temperature.

I claim:

1. An apparatus for adjustment of the brake pressure to the pevailing force condition between the road surface and the running face of a vehicle wheel in vehicles braked by fluid means, comprising
    a main braking pressure conduit,
    an inlet valve and an exhaust valve, both said valves disposed in said main conduit,
    means for switching alternately the position of said valves in dependency upon a sensing means controlling the prevailing wheel retardation,
    holding means cooperating with said switching means,
    said switching means and said holding means being designed and coordinated to each other such that upon surpassing of a given retarding limit value measured by said sensing means said inlet valve is closed and said exhaust valve is opened, while upon undercutting of said given retarding limit value said exhaust valve is closed and said inlet valve is opened only after run of the holding time determined by said holding means,
    said switching means including a further electric circuit for operation of said inlet valve.
    a second electric circuit for operation of said exhaust valve, and
    said holding means being disposed only in said first electric circuit.

2. The apparatus, as set forth in claim 1, wherein
    said switching means comprises a retarding sensor having a first electric switch,
    means for closing said first switch for the duration of occurrence of a retardation of rotation of said vehicle wheel surpassing said given limit value, and
    said holding means is designed in dependency upon said switching means including a second switch such that said second switch is rendered operative during an increased retardation and is rendered inoperative after the run of a predetermined holding time.

3. The apparatus, as set forth in claim 2, wherein
    said second switch of said holding means is in series with a diode parallel to said first switch,
    a magnet winding for said inlet valve and for said exhaust valve,
    the connecting point of said diode and of said holding means leads to said winding of said inlet valve and the diode-side end of said parallel circuit leads to said winding of said exhaust valve, and
    an electric source disposed between the other end of said parallel circuit and the free terminals of said windings.

4. The apparatus, as set forth in claim 3, wherein
    said holding means are hydraulically operated and comprise a pressure operated switch, a pressure reducing valve and a throttle, and
    said pressure reducing valve and said throttle are disposed each in a parallel branch of the exhaust conduit and said pressure operated switch is connected with a pressure chamber between said exhaust valve and said parallel branches.

5. The apparatus, as set forth in claim 4, which includes
    another throttle disposed in said exhaust conduit, which additional throttle determines the timely pressure drop in said exhaust conduit.

6. The apparatus, as set forth in claim 5, wherein
    said pressure reducing valve and a further throttle having smaller cross-sections are disposed between said exhaust valve and said additional throttle.

7. The apparatus, as set forth in claim 6, which includes
    a second parallel disposed pressure reducing conduit having another exhaust valve and another throttle, and
    an additional sensor controlling said another exhaust valve, said additional sensor being set to a higher retarding limit value.

8. The apparatus, as set forth in claim 1, which includes
    a throttle and said inlet valve, to constitute two elements,
    at least one of said elements is bridged over by means of a pressure limiting valve, and
    the pressure in the wheel brake cylinder determines the position of said pressure limiting valve.

9. The apparatus, as set forth in claim 8, wherein
    said pressure limiting valve comprises a valve body biased by a weak spring and a pin operated by a settable, resilient membrane and engaging said valve body, and
    said membrane is subjected to the pressure prevailing in said wheel brake cylinders.

10. The apparatus, as set forth in claim 8, wherein
    at least one of said elements is bridged over by a leak-throttle.

11. The apparatus, as set forth in claim 1, which includes
    means for variably controlling said holding means as to their time value.

12. The apparatus, as set forth in claim 4, which includes
    a storage chamber disposed at the end of said pressure reducing conduit and having a movable wall biased by a weak spring, and
    a return conduit including a return valve is disposed between said storage chamber and the main pressure conduit.

13. The apparatus, as set forth in claim 12, wherein
    said means for variably controlling said holding means comprises a drive connection between said movable wall of said storage chamber and said throttle.

References Cited

UNITED STATES PATENTS

| | | | |
|---|---|---|---|
| 3,066,988 | 12/1962 | McRae | 303—21 X |
| 2,039,701 | 5/1936 | Bush. | |
| 3,017,145 | 1/1962 | Yarber | 244—111 |

MILTON BUCHLER, Primary Examiner

J. J. McLAUGHLIN, Jr., Assistant Examiner

U.S. Cl. X.R.

188—181

UNITED STATES PATENT OFFICE
CERTIFICATE OF CORRECTION

Patent No. 3,494,670  Dated  February 10, 1970

Inventor(s) HEINZ LEIBER

It is certified that error appears in the above-identified patent and that said Letters Patent are hereby corrected as shown below:

In the heading of the patent specification, line 5 for "G.m.b.H., and Teldix Luftfahrt-Ausrunstungs-G.m.b.H,"

read -- G.m.b.H., and Teldix Luftfahrt-Ausrüstungs-G.m.b.H.,

SIGNED AND
SEALED
JUL 21 1970

(SEAL)
Attest:

Edward M. Fletcher, Jr.
Attesting Officer

WILLIAM E. SCHUYLER, JR.
Commissioner of Patents